(12) United States Patent
Dubal et al.

(10) Patent No.: US 6,711,630 B2
(45) Date of Patent: Mar. 23, 2004

(54) METHOD AND APPARATUS FOR COMMUNICATING WITH PLUG AND PLAY DEVICES

(75) Inventors: Scott P. Dubal, Beaverton, OR (US); Brian C. Schuettke, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 320 days.

(21) Appl. No.: 09/863,608

(22) Filed: May 22, 2001

(65) Prior Publication Data

US 2002/0178300 A1 Nov. 28, 2002

(51) Int. Cl.⁷ .............................. G06F 13/14
(52) U.S. Cl. ................ 710/8; 710/10; 710/15; 707/100
(58) Field of Search ................ 710/8, 10, 15; 707/100

(56) References Cited

U.S. PATENT DOCUMENTS

| | | | | |
|---|---|---|---|---|
| 5,559,965 A | * | 9/1996 | Oztaskin et al. | 710/107 |
| 5,748,980 A | * | 5/1998 | Lipe et al. | 710/8 |
| 5,812,820 A | * | 9/1998 | Loram | 395/500 |
| 6,032,201 A | * | 2/2000 | Tillery et al. | 710/8 |
| 6,092,135 A | * | 7/2000 | Kown | 710/104 |
| 6,178,468 B1 | * | 1/2001 | Rudd et al. | 710/8 |
| 6,345,319 B2 | * | 2/2002 | Lin et al. | 710/8 |

OTHER PUBLICATIONS

White paper "About GUID's, Driver Technical Tips".
Product Support Quantum Drives White Papers, Ultra160, Ultra320, and Ultra 640 SCSI, www.maxtor.com/Quantum/scr/whitepapers/wp_ultra320.htm, Oct. 11, 2000.

* cited by examiner

*Primary Examiner*—Abdelmoniem Elamin
(74) *Attorney, Agent, or Firm*—Blakely, Sokoloff, Taylor & Zafman LLP

(57) ABSTRACT

A method and apparatus for communicating with a plug and play device, for example, a network adapter comprising, searching a system registry for an identity corresponding with a plug and play device; obtaining a symbolic link list corresponding with the identity obtained from the registry; obtaining a pointer to a device object corresponding with a symbolic link in the symbolic link list; and using the device object to obtain information about the plug and play device. The information obtained may then be used to communicate with the plug and play device.

12 Claims, 3 Drawing Sheets

METHOD AND APPARATUS FOR COMMUNICATING WITH PLUG AND PLAY DEVICES

COPY RIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND

1. Field of the Invention

The present invention is related to the field of networking. In particular, the present invention is related to a method and apparatus for communicating with plug and play devices.

2. Description of the Related Art

Device drivers typically scan all the Peripheral Component Interconnect (PCI) slots and buses when searching for a PCI plug and play network adapter in a plug and play operating system. Plug and play is an Intel standard for the design of personal computer expansion boards. Plug and play eliminates the frustration of configuring the system when adding new peripherals, and self configure interrupt requests, direct memory access settings, and memory addresses on startup.

Device drivers often use legacy operating system function calls such as, get adapter, get bus information, etc. in order to detect a PCI plug and play network adapter. Some versions of Microsoft's operating system do not support legacy operating system function calls for detecting and communicating with plug and play devices. Moreover, future versions too will not support legacy operating system function calls for detecting and communicating with plug and play devices.

Under Microsoft's operating system, a network device that fails to boot is declared invalid in the Windows registry, and the network adapter interface, i.e., the Network Driver Interface Specification (NDIS) driver for the particular network device does not load. The NDIS driver allows network drivers invoked by application programs to communicate with network devices, e.g. network adapters. However, since the NDIS driver does not load, the network adapters cannot be accessed by the application programs. Moreover, because legacy operating system function calls are not supported by Microsoft's plug and play operating system, kernel-mode network device drivers are also unable to access the network adapters. This makes diagnosis of problems associated with the network adapters virtually impossible.

BRIEF SUMMARY OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION

Described is a method and apparatus for communicating with a network adapter in a Microsoft® plug and play operating system. Although the technique disclosed herein is described as communicating with a network adapter, the technique may be used to communicate with other plug and play devices such as sound cards, video cards, input/output cards, etc. The method searches a system registry for an identity corresponding with a network adapter, obtains a symbolic link list corresponding with the identity from the system registry, obtains a pointer to a device object corresponding with a symbolic link in the symbolic link list, and uses the device object to obtain information about the network adapter.

The information obtained may then be used to query the network adapter to aid in, for example, fault finding and fault diagnosis. In the following description numerous specific details are set forth in order to provide a thorough understanding of the present invention. It will be apparent, however, to one of ordinary skill in the art that the present invention may be practiced without these specific details. In other instances, well-known architectures, steps, and techniques have not been shown to avoid obscuring the present invention.

The invention may utilize a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

In addition, it should be understood that the programs, processes, method, etc. described herein are not related or limited to any particular computer or apparatus nor are they related or limited to any particular communication network architecture. Rather, various types of general purpose machines, wired or wireless, may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in a nonvolatile memory such as read only memory.

Figure 1:
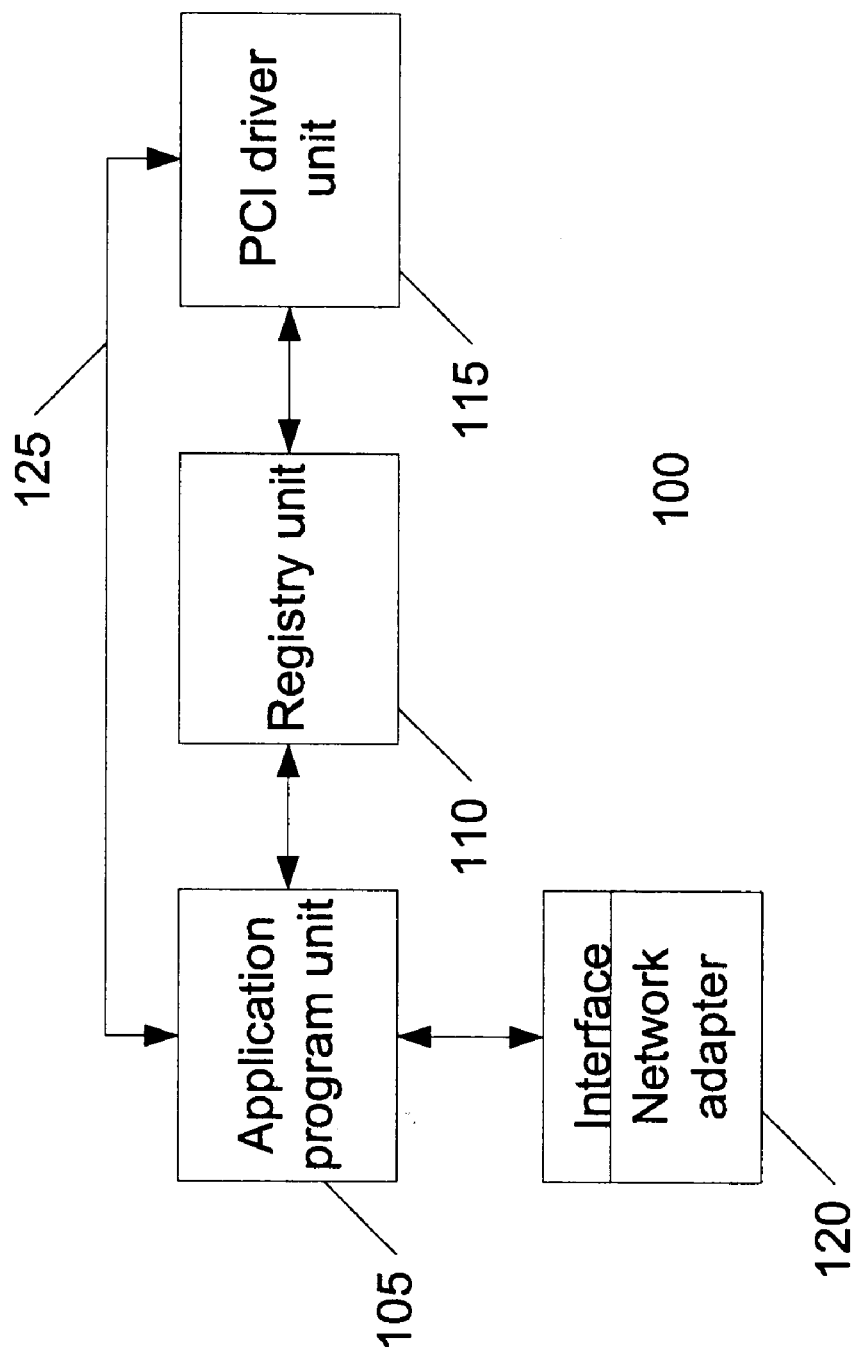
FIG. 1 illustrates a block diagram of one embodiment of a network adapter communication unit.

FIG. 1 illustrates one embodiment of a block diagram of a network adapter communication unit. The network adapter communication unit 100 includes an application program unit 105 that sends an index to a registry unit 110. The application program unit 105 can be an application program, and the index is a counter that increments each time the application program obtains the next physical device object (PDO). The application program unit 105 increments the index to obtain the next PDO, until the application program unit receives a "null" data structure from the PCI driver unit 115.

The registry unit 10 searches the Windows registry for an identity corresponding with a network adapter. The Windows registry is a database that includes configuration data about a computer, and includes hardware information, e.g., network adapter information. In particular, the registry unit 10 searches the Windows registry for a GUID_NDIS_LAN_CLASS GUID. A GUID is a Global Unique Identifier that uniquely identifies a plugin and it's capabilities. For a network adapter, a GUID uniquely identifies a network adapter's interface.

A network adapter's interface is an object that provides a defined set of input/output Request Packet (IRP) based services, and is instantiated in a particular device object. The Windows input/output (I/O) subsystem is a packet-driven system wherein each I/O operation is described by a single IRP. A device object that is created by a bus driver is referred to as a physical device object (PDO), and represents the underlying bus driver in the stack of plug and play drivers for a device.

Once the GUID_NDIS_LAN_CLASS GUID for the network adapter interface is obtained, the registry unit 110 obtains the symbolic link list associated with the GUID_NDIS_LAN_CLASS GUID from the Windows registry. The symbolic link list represents a list of PDOs corresponding to the plug and play network adapters. Next, the registry unit 110 obtains the symbolic link from the symbolic link list corresponding with the index received from the calling program. In particular, each symbolic link in the symbolic link list is enumerated, or iterated through, until the index value passed by the calling program is equaled. In one embodiment, the index sent by the calling program to the registry unit is incremented until a "null" data structure is passed by the PCI driver unit 115 to the application program unit 105. The symbolic link obtained from the Windows registry refers to a particular PDO associated with the network adapter interface. In particular, the symbolic link is used to query the operating system to obtain a pointer to the PDO associated with the network adapter interface.

In one embodiment, a bi-directional connection 125 exists between the application program unit 105 and the PCI driver unit 115. IRPs may be sent either by the application program unit 105 or by the PCI driver unit 115 to query the operating system's PCI driver. Using the symbolic link for the particular PDO as a pointer to the PDO, an IRP, for example, the IRP_MN_QUERY_BUS_INFORMATION may be sent by the PCI driver unit 115 to query the operating system's PCI driver in the Windows driver stack for the type and instance number of a network adapter's parent bus. In one embodiment, after obtaining the type and instance number of a network adapter's parent bus, an IRP may be sent to the operating system's PCI driver to ensure that communication is established with the PCI bus.

Using the pointer to the particular PDO, a portion, for example, the first 64 bytes of the PCI configuration header for the specific PCI network adapter may be read and stored in a data structure. Other IRPs, for example, the IRP_MN_QUERY_CAPABILITIES may be sent to determine the capabilities of the network adapter. An IRP_MN_QUERY_ID IRP may be sent to determine the unique device identity number assigned by the operating system to the network adapter. In one embodiment, the capabilities of the network adapter as well as the unique device identity number assigned by the operating system to the network adapter may be stored in a data structure. The data structure may be passed by the PCI driver unit 115 to the application program unit 105 using the bidirectional connection 125.

The application program unit 105 may use the data structure to communicate with the network adapter to aid in fault finding when the NDIS driver does not load, or when the operating system does not support legacy operating system function calls to the network device drivers. The network adapter communication unit 100, does not require PCI configuration information in the data structure to conform to either the Windows Win32 Driver Model (WDM) or to the NDIS driver specification. As a result, the data structure obtained can be used in both the WDM and NDIS drivers. Additionally, the network adapter detection unit 100 speeds up scanning for PCI network adapters as the network adapter detection unit 100 generates PCI configuration read cycles for the PDOs returned by the data structure, instead of PCI configuration read cycles for every PCI slot found by the PCI bus.

Figure 2:
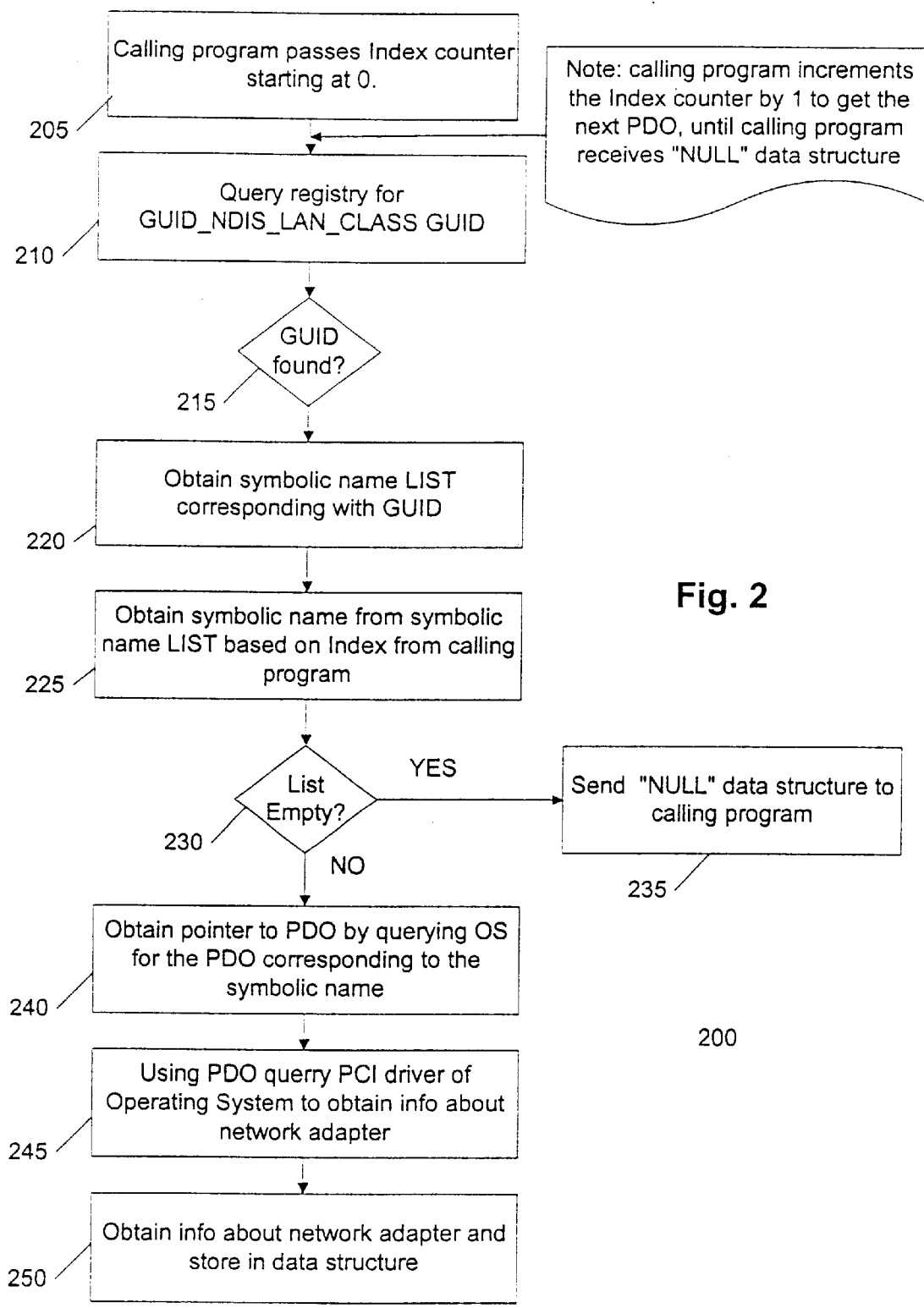
FIG. 2 illustrates one embodiment of a flow diagram for communicating with a network adapter.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may. FIG. 2 is one embodiment of a flow diagram that illustrates the process 200 by which an application program may communicate with a network adapter when the NDIS driver does not load, or when the operating system does not support legacy operating system function calls to the network device drivers. At 205 an application program sends an index to a subroutine or a function that queries the Windows registry. At 210, the subroutine or function searches the Windows registry for an identity corresponding with a network adapter. In particular, the application program queries the Windows registry for an GUID_NDIS_LAN_CLASS GUID. At 215, a determination is made weather the GUID being searched for has been found in the Windows registry.

If the GUID being searched for is found in the Windows registry, at 220, a symbolic link list corresponding with the GUID is obtained from the Windows registry. At 225, the symbolic link in the symbolic link list corresponding with the index from the calling program is obtained. Each symbolic link in the symbolic link list is enumerated or iterated through until the index value passed by the calling application program is equaled. At 230 a determination is made whether the end of the symbolic link list is reached. If the end of the symbolic link list is reached, at 235 a "null" data structure is passed to the calling application program.

If the end of the symbolic link list has not been reached, at 240 the symbolic link corresponding with the index is used to query the operating system to obtain a pointer to a PDO associated with the required network adapter. Once the pointer to the PDO corresponding with the required network adapter is obtained, at 245 one or more IRPs are sent to query the PCI driver of the operating system to obtain configuration and capability information about the network adapter. At 250, the network adapter configuration and capability information including a unique device identity number assigned by the operating system to the network adapter is obtained and stored in a data structure. The data structure may be used to communicate with the network adapter to diagnose faults when the NDIS driver does not load or when the operating system does not support legacy operating system function calls to the network device drivers.

The detailed description that follows is represented largely in terms of processes and symbolic representations of operations by conventional computer components, including a local processing unit, memory storage devices for the local processing unit, display devices, and input devices. As well understood by those skilled in the art, these operations often take the form of electrical, magnetic, or optical signals capable of being stored, transferred, combined, and otherwise manipulated through, for instance, electrical components. Furthermore, these processes and operations may utilize conventional computer components in a heterogeneous distributed computing environment, including remote file servers, computer servers, and memory storage devices. Each of these conventional distributed computing components is accessible to the local processing unit by a communication network.

Figure 3:
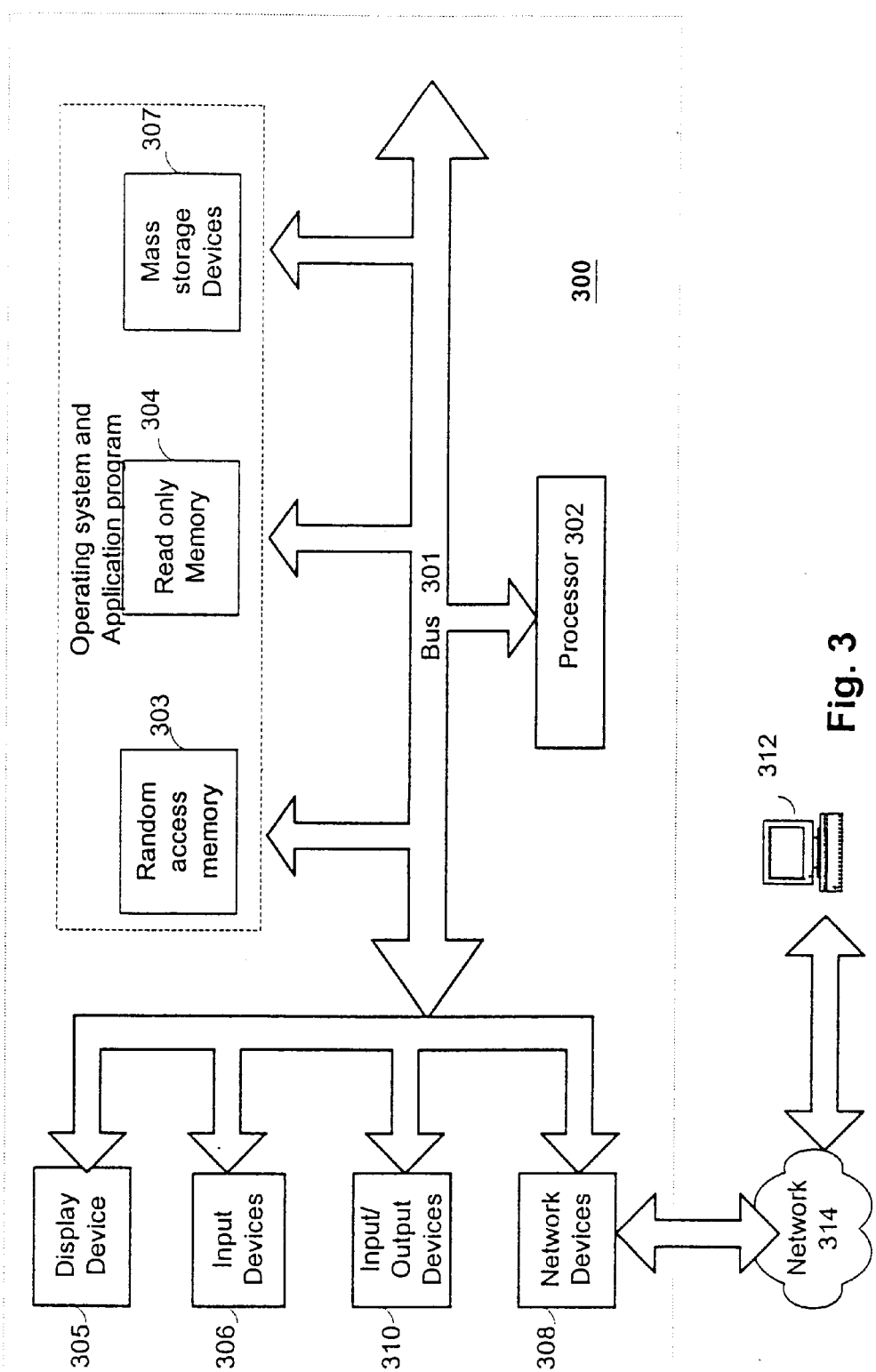
FIG. 3 illustrates one embodiment of an apparatus for communicating with a network adapter.

FIG. 3 illustrates a typical computer system 300 in which the present invention operates. The computer system is used to execute an application program to search a system registry for an identity corresponding with a network adapter, to obtain a symbolic link list corresponding with the identity from the system registry, to obtain a pointer to a device object corresponding with a symbolic link in the symbolic link list, and to use the device object to obtain information about the network adapter. The information obtained may then be used to query the network adapter to aid in fault finding and fault diagnosis.

One embodiment of the present invention is implemented on a personal computer (PC) architecture. Alternative computer system architectures or other processor, programmable or electronic-based devices may also be employed. Computer system 300 includes a processor 302 coupled through a bus 301 to a random access memory (RAM) 303, a read only memory (ROM) 304, and a mass storage device 307. Mass storage device 307 represents a persistent data storage device, such as a floppy disk drive, fixed disk drive (e.g., magnetic, optical, magneto-optical, or the like), or streaming tape drive. Processor 302 may be any of a wide variety of general purpose processors or microprocessors (such as the Pentium® processor manufactured by Intel® Corporation), a special purpose processor, or a specifically programmed logic device.

Display device 305 is coupled to processor 302 through bus 301 and provides graphical output for computer system 300. Input devices 306 such as a keyboard or mouse are coupled to bus 301 for communicating information and command selections to processor 302. Also coupled to processor 302 through bus 301 is an input/output interface 310 which can be used to control and transfer data to electronic devices (printers, other computers, etc.) connected to computer system 300. Computer system 300 includes network devices 308 for connecting computer system 300 to one or more networks 314. Network devices 308, may include Ethernet devices including network adapters, phone jacks and satellite links. It will be apparent to one of ordinary skill in the art that other network devices may also be utilized.

One embodiment of the invention may be stored entirely as software on mass storage 307. Another embodiment of the invention may be embedded in hardware, for example, in a printed circuit board, in a special purpose processor, or in a specifically programmed logic device communicatively coupled to bus 301. Still other embodiments of the invention may be implemented partially as software and partially as hardware.

Embodiments of the invention may be represented as software stored on a machine-accessible medium (also referred to as a computer-accessible medium or a processor-accessible medium). The machine-accessible medium may be any type of magnetic, optical, or electrical storage medium including a diskette, CD-ROM, memory device (volatile or non-volatile), or similar storage mechanism. The machine-accessible medium may contain various sets of instructions, code sequences, configuration information, or other data. Other instructions and operations necessary to implement the described invention may also be stored on the machine-accessible medium.

Thus a method and apparatus have been disclosed for communicating with a network adapter in a Microsoft® operating system. While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method comprising:

searching a system registry for a global unique identifier corresponding to a plug and play device;

obtaining a symbolic link list corresponding to the global unique identifier;

obtaining a symbolic link in the symbolic link list corresponding to an index;

using the symbolic link to query an operating system for a pointer to a device object; and using the device object to obtain information about the plug and play device.

2. The method as in claim 1, wherein using the device object to obtain information about the plug and play device comprises using a physical device object to obtain configuration information about the plug and play device.

3. The method as in claim 1, wherein the plug and play device comprises a network adapter.

4. An article of manufacture comprising:

a machine-accessible medium including instructions that, when executed by a machine, causes the machine to perform operations comprising:

searching a system registry for a global unique identifier corresponding to a plug and play device;

obtaining a symbolic link list corresponding to the global unique identifier;

obtaining a symbolic link in the symbolic link list corresponding to an index;

using the symbolic link to query an operating system for a pointer to a device object; and using the device object to obtain information about the plug and play device.

5. An article of manufacture as in claim 4 wherein using the device object to obtain information about the plug and play device comprises using a physical device object to obtain configuration information about the plug and play device.

6. An article of manufacture as in claim 4 wherein said instructions for searching the system registry for the global unique identifier corresponding to the plug and play device comprise instructions for searching the system registry for a global unique identifier corresponding to a plug and play network adapter.

7. A computer system comprising:

a bus;

a data storage device coupled to said bus; and a processor coupled to said data storage device, said processor operable to receive instructions which, when executed by the processor, cause the processor to perform a method comprising:

searching a system registry for a global unique identifier corresponding to a plug and play device;

obtaining a symbolic link list corresponding to the global unique identifier;

obtaining a symbolic link in the symbolic link list corresponding to an index;

using the symbolic link to query an operating system for a pointer to a device object; and using the device object to obtain information about the plug and play device.

8. A computer system as in claim 7 wherein using the device object to obtain information about the plug and play device comprises using a physical device object to obtain configuration information about the plug and play device.

9. A computer system as in claim 7 wherein the plug and play device comprises a network adapter.

10. An apparatus comprising:

means for searching a system registry for a global unique identifier corresponding to a plug and play device;

means for obtaining a symbolic link list corresponding to the global unique identifier;

means for obtaining a symbolic link in the symbolic link list corresponding to an index;

means for using the symbolic link to query an operating system for a pointer to a device object; and means for using the device object to obtain information about the plug and play device.

11. An apparatus as in claim 10, wherein the means for using the device object to obtain information about the plug and play device comprises means for using a physical device object to obtain configuration information about the plug and play device.

12. An apparatus as in claim 10, wherein the means for searching the system registry for an identity corresponding to the plug and play device comprises means for searching a system registry for an identity corresponding to a network adapter.

* * * * *

UNITED STATES PATENT AND TRADEMARK OFFICE
CERTIFICATE OF CORRECTION

PATENT NO.      : 6,711,630 B2
DATED           : March 23, 2004
INVENTOR(S)     : Dubal et al.

It is certified that error appears in the above-identified patent and that said Letters Patent is hereby corrected as shown below:

<u>Column 2,</u>
Lines 56 and 61, delete "10" and insert -- 110 --.

Signed and Sealed this

Seventeenth Day of August, 2004

JON W. DUDAS
*Acting Director of the United States Patent and Trademark Office*